United States Patent
Schemmann et al.

(10) Patent No.: US 10,291,970 B2
(45) Date of Patent: May 14, 2019

(54) TRUNK AND DROP RFOG ARCHITECTURE

(71) Applicant: ARRIS Enterprises LLC, Suwanee, GA (US)

(72) Inventors: Marcel F. Schemmann, Maria Hoop (NL); Venkatesh G. Mutalik, Middletown, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/393,914

(22) Filed: Dec. 29, 2016

(65) Prior Publication Data

US 2017/0195756 A1 Jul. 6, 2017

Related U.S. Application Data

(60) Provisional application No. 62/272,790, filed on Dec. 30, 2015.

(51) Int. Cl.
| | |
|---|---|
| *H04J 14/00* | (2006.01) |
| *H04Q 11/00* | (2006.01) |
| *H04B 10/2507* | (2013.01) |
| *H04B 10/2575* | (2013.01) |
| *H04B 10/272* | (2013.01) |
| *H04J 14/02* | (2006.01) |

(52) U.S. Cl.
CPC ..... *H04Q 11/0005* (2013.01); *H04B 10/2507* (2013.01); *H04B 10/25751* (2013.01); *H04B 10/272* (2013.01); *H04J 14/0282* (2013.01); *H04Q 11/00* (2013.01); *H04J 14/0298* (2013.01); *H04Q 2011/0015* (2013.01); *H04Q 2011/0037* (2013.01)

(58) Field of Classification Search
CPC ...... H04J 14/02; H04J 14/0282; H04B 10/27; H04B 10/272; H04B 10/2575; H04B 10/25751; H04B 10/2507; H04B 10/0795; H04B 10/07955; H04Q 11/0005
USPC ........ 398/66, 67, 68, 69, 70, 71, 72, 79, 33, 398/34, 37, 38, 158, 159, 160, 115, 82, 398/83, 173, 175, 177, 180, 181, 176
See application file for complete search history.

(56) References Cited

U.S. PATENT DOCUMENTS

| | | | |
|---|---|---|---|
| 2009/0080890 A1* | 3/2009 | Miura | ............ H04B 10/27 398/72 |
| 2012/0163830 A1 | 6/2012 | Lee et al. | |

(Continued)

OTHER PUBLICATIONS

PCT Search Report & Written Opinion, Re: Application No. PCT/US2016/069239, dated Apr. 19, 2017.

(Continued)

*Primary Examiner* — Hanh Phan
(74) *Attorney, Agent, or Firm* — Lori Anne D. Swanson

(57) ABSTRACT

In an optical system having multiple cascaded splitter/combiners, a trunk port and/or a drop port is configured for at least one of the splitter/combiner units. Drop ports may be configured with an average gain control, and the trunk ports may be configured to have individual gain control to provide a more precise overall gain and to maintain adequate signal levels. Embodiments apply to evolving RFoG architectures designed to serve a large number of subscribers without suffering from OBI (Optical Beat Interference) by retransmitting an optical signal through cascading splitters/combiners.

20 Claims, 9 Drawing Sheets

(56) References Cited

U.S. PATENT DOCUMENTS

2015/0304038 A1 10/2015 Schemmann et al.
2016/0204877 A1* 7/2016 Brooks .................. H04B 10/29
                                                        398/208

OTHER PUBLICATIONS

M.O. Van Deventer, et al., "Architectures for 100 km 2048 Split Bidirectional SuperPONs from ACTS-PLANET", Optomechatronic Micro/Nano Devices and Components III; Oct. 8-10, 2007, Proceedings of SPIE, ISSN 0277-786X, vol. 2919, Oct. 20, 1996, pp. 242-251.

* cited by examiner

TRUNK AND DROP RFOG ARCHITECTURE

BACKGROUND

An impairment of traditional radio frequency over glass (RFoG) communication channels is Optical Beat Interference (OBI), thereby afflicting RFoG networks. OBI occurs when two or more reverse path transmitters are powered on, and are very close in wavelength to each other. OBI limits upstream traffic, but can also limit downstream traffic. Existing efforts at mitigating OBI include adjusting ONUs to be wavelength specific, creating an RFoG-aware scheduler in the CMTS, changing ONU wavelengths in real-time, or combining multiple upstream inputs nominally in the same wavelength range.

Optical Beat Interference (OBI) and the limited return link budget are problems in RFoG return networks (see http://www.scte.org/documents/pdf/Standards/ ANSI_SCTE_174_2010.pdf for an overview of RFoG networks). In such networks typically a star splitter distributes light over 32 subscribers, the same splitter combines return light from the 32 subscribers at a penalty of 15 dB of loss. Also the optical combining of multiple sources at nominally the same wavelength can cause optical beat interference such that the information content can be overwhelmed by noise.

Thus, improved techniques for reducing distortions in a network are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DETAILED DESCRIPTION

Disclosed herein are techniques for improving gain features in an optical network using drop ports and trunk ports.

In embodiments, the drop ports are configured with an average gain control and the trunk ports are configured to have individual gain control to provide a more precise overall gain and to maintain adequate signal levels. Embodiments apply to evolving RFoG architectures designed to serve a large number of subscribers without suffering from OBI (Optical Beat Interference) by retransmitting an optical signal through cascading splitters/combiners. In such architectures, a gain may result that varies for the multiple retransmissions, thereby causing an overall gain variation that may impact system margins. For a splitter/combiner that has a gain controlled by the average input power to the ports, regardless if the port is connected to an ONU or to another splitter/combiner unit, an upstream gain variation results through multiple retransmissions. Applying the disclosed techniques to the cascaded splitter/combiner architecture with a differentiation of drop and trunk ports, however, may improve the gain features of the system and improve the system's signal to noise margin.

Figure 3:
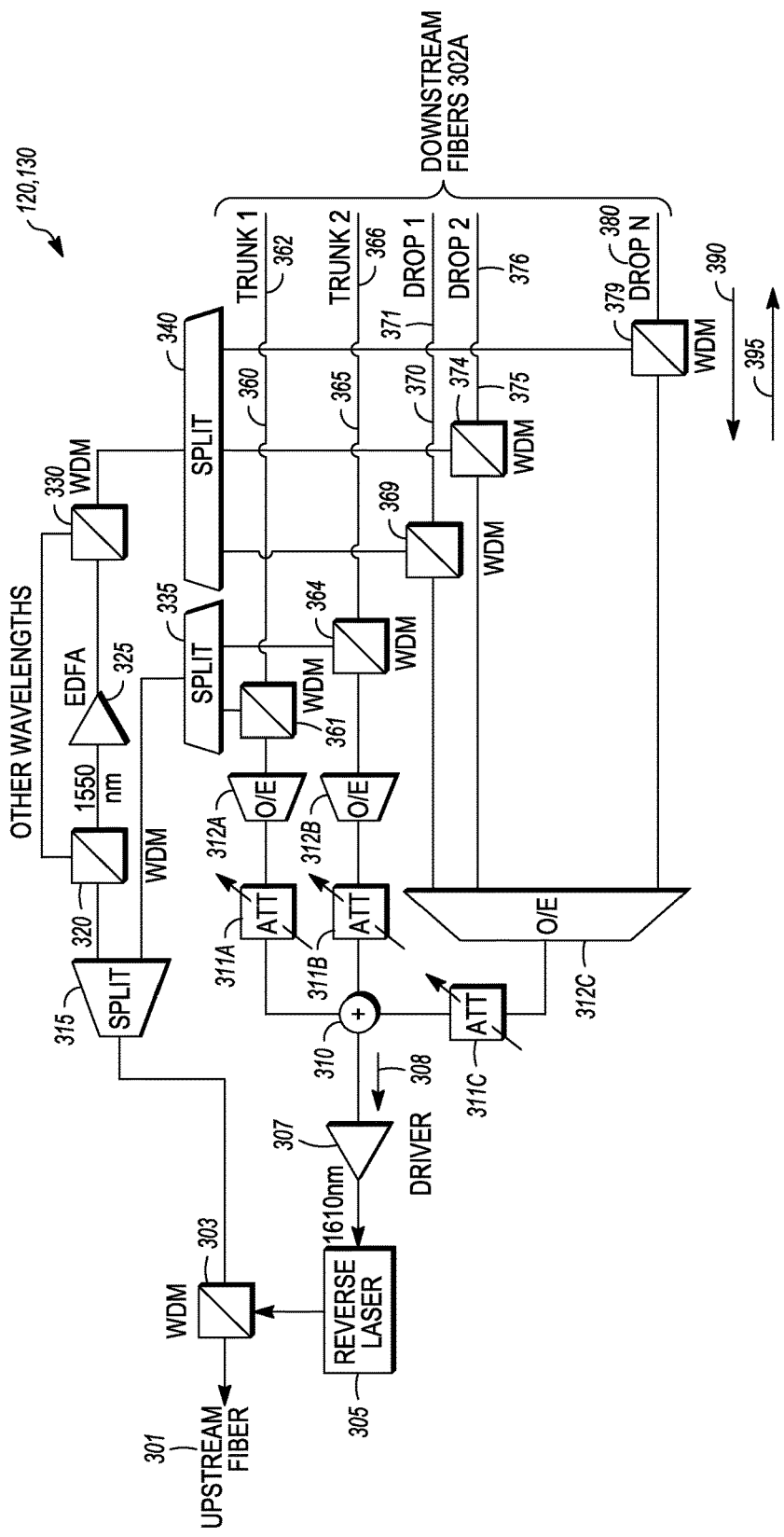
FIG. 3 depicts a design for a splitter/combiner usable in the trunk and drop architecture.

As disclosed herein, new features of the network architecture are defined for addressing the varying gain problem and for enabling a flexible configuration of trunk and drop ports. By modifying optical parts, such as adding a drop port with average gain control and/or adding trunk ports with individual gain control, system performance may be improved. In embodiments, gain control is improved by detecting a trunk vs drop port connection by evaluating an input power state and a difference between on/off power states. In embodiments, a high performance, low-noise receiver front-end (RFE) is included to reduce an accumulation of noise and allow high input power for a better signal-to-noise ratio (SNR). For example, FIG. 3 depicts receivers 312A and 312B which are high performance receivers, i.e., low noise receivers capable of high optical input power. In this example, receivers 312a and 312b would be high performance receivers and 312 c is a multi-input receiver such as a transmission line receiver. Pilot tones may facilitate a more precise modulation index calibration. In the downstream, a ratio may be determined for splitting power to the drop and trunk ports to improve SNR on cascaded trunk ports. EDFAs may be included to amplify signals independently among the port types. Further, embodiments are described that include an RF gain switch on unused drop ports through a detection of upstream traffic activity. For example, individual RF switches may be implemented for the drop ports, such as that described herein for a transmission line receiver.

Modern CATV transmission systems have replaced much of the legacy RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Improvements to CATV architectures that provide further improvements in delivery of content include Fiber-to-the Premises (FTTP) architectures that replace the coaxial network between a node and a subscriber's home with a fiber-optic network. Such architectures are also called Radio Frequency over Glass (RFoG) architectures. A benefit of RFoG is that it provides for faster connection speeds and more bandwidth than current coaxial transmission paths are capable of delivering. For example, a single copper coaxial pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

An RFoG topology includes an all-fiber service from the headend to a field node or optical network unit (ONU), which is typically located at or near the user's premises. In the headend, a downstream laser sends a broadcast signal that is optically split multiple times. The optical network unit, or ONU, recovers the RF broadcast signal and passes it into the subscriber's coax network.

Content providers attempt to minimize or eliminate optical beat interference in RFoG networks. For example, the revolutionary ARRIS AgileMax is a hybrid passive optical network (HPON) solution that completely eliminates Optical Beat Interference (OBI) in Advanced DOCSIS and FTTP deployments. The AgileMax is a splitter/combiner unit as described herein that is built around a transmission line receiver concept connecting a large number of photo-diodes to a single amplifier without a loss of performance. However if there is only one gain control possible for all the diodes, then the gain is not adjustable for any particular input, such as one or more trunk fibers that require precise gain control. Disclosed herein are techniques for expanding such AgileMax architectures with one or more trunk receivers that permit individual gain control. The disclosed techniques enable a control of the gain even for multiple units cascaded along a trunk line, thereby providing a manner for maintaining a precise overall gain if desired. As used herein, a splitter/combiner unit references such AgileMax functionality.

Figure 1A:
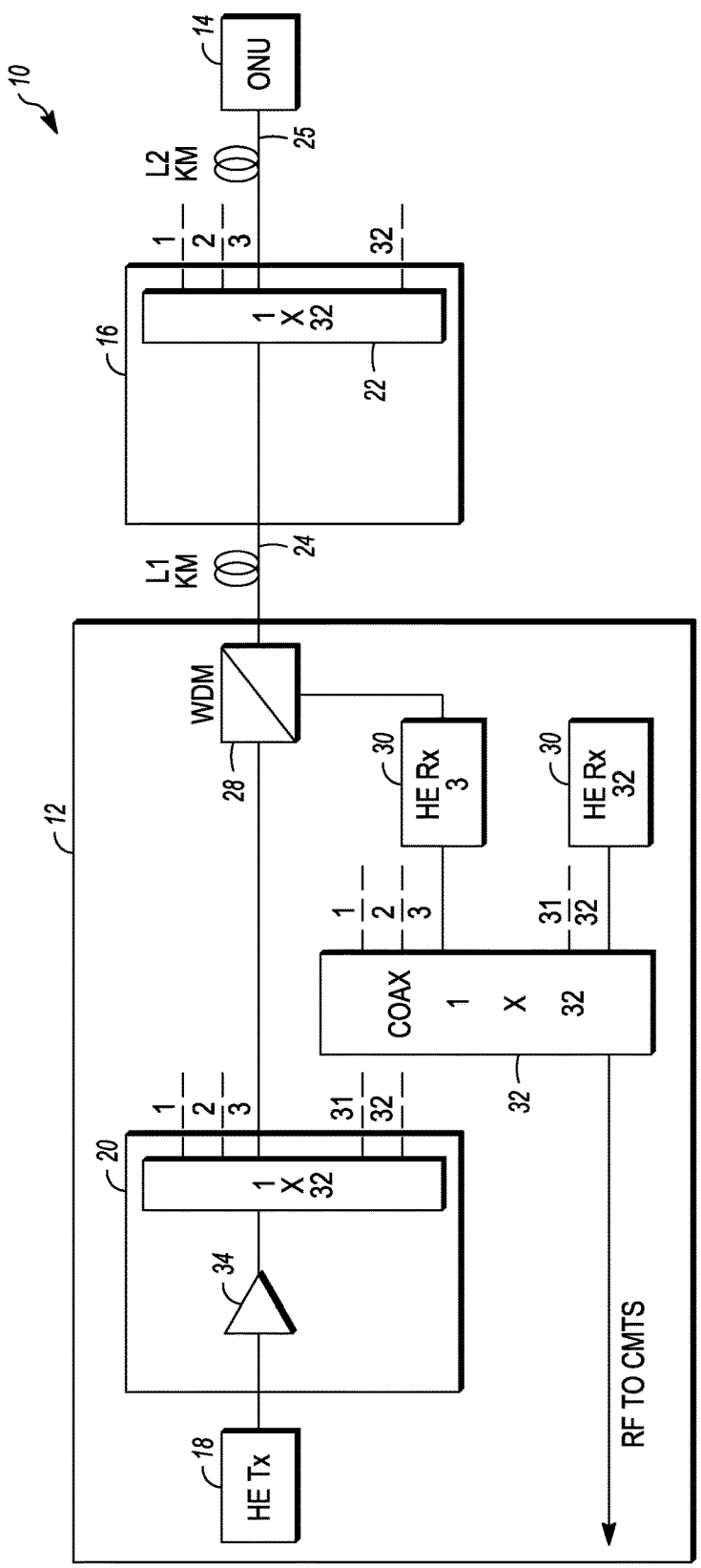
FIG. 1A depicts a radio frequency over glass (RFoG) architecture.

FIG. 1A shows an exemplary RFoG system 10, where a head end 12 delivers content to an ONU 14 at a customer's premises through a node 16. An RFoG topology includes an all-fiber service from the headend 12 to a field node or optical network unit (ONU), which is typically located at or near the user's premises. In the headend 12, a downstream laser sends a broadcast signal that is optically split multiple times. The optical network unit 14, or ONU, recovers the RF broadcast signal and passes it into the subscriber's network, which may be coaxial or also upgraded with fiber communication.

The head end 12 may include a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16. The node 16 may include another 1×32 splitter 22, where each output port of the splitter 22 is connected via another fiber segment 26 to a particular ONU 14 at a subscriber's premises.

Optical networking units (ONUs) in an RFoG environment may terminate the fiber connection at a subscriber-side interface and convert traffic for delivery over the in-home network at the customer premises. Coaxial cable can be used to connect the ONUs of an RFoG network to one or more user device, wherein the RFoG user devices can include cable modems, EMTAs, or set-top boxes, as with the user devices of an HFC network. For example, an R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end, the splitter 22 operates as a combiner, i.e. for a 1×32 port splitter/combiner 22, up to 32 ONUs may deliver return path signals to the node 16, which combines them for upstream transmission along fiber length 24. Each of the signals from the respective ONU's 14 is then separated from other signals by the WDM 28 to be received by a separate receiver 30 in the head end 12. The signals from the respective receivers are then combined by a combiner 32 for transmission to a Cable Modem Termination Service (CMTS) in the head end 12. The signals are combined in the RF domain in the headend 12 by the combiner 32, before being connected to the CMTS upstream port. Combined with the forward power limit on the fiber, the combined signals may require one forward fiber 24 (L1 km) per group of 32 subscribers.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 may transmit 1550 nm light from the EDFA 34 in the forward direction and direct reverse light, typically at 1610 nm or perhaps 1310 nm in the reverse direction to the receivers 30. The WDM 28 may be connected to a fiber of length L1 that feeds the splitter 22 in the node 16.

The outputs of the splitter 22 may each be provided to second fibers of length L2 that are respectively connected to ONUs 14 at the subscriber homes. In embodiments, L1+L2 may be up to 25 km. The ONUs 14 convert the forward transmitted light to RF signals for the in-home coaxial network. In the return direction, the ONUs 14 may also receive RF signals from the in-home network and modulate these signals onto a laser, operating at 1610 nm for example, and the laser's output is sent upstream into the fiber L2. The upstream signal may be combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the optical combiner 22 may be passive and combine multiple optical inputs to a single output. Thus, by definition the optical combiner 22 may create OBI between these inputs, as described earlier and will therefore create noise in the RF domain at the head end receivers 30. Furthermore, assume a loss of around 24 dB in the forward path; for an EDFA output power of 18 dBm per port this provides −6 dBm power to the receivers. This is sufficient for acceptable performance at the ONU to 1 GHz, provided low noise high gain receivers are used.

In case the 32 subscribers can be received individually at the star splitter location then the input power to the receiver is high, almost as high as the return laser power since the links to the star splitter are short. A high SNR is readily obtained and there is no OBI. The combined signal of all received signals must then be re-transmitted over the long (25 km) fiber link and detected at the headend. At the headend multiple such return links need to be combined so a similar multiple input receiver design could be used. The multiple input receivers may be designed such that the thermal noise figure does not depend on how many inputs are used such that combining of multiple sources is straightforward. However the thermal noise figure is higher than that of a regular receiver. This may be overcome by the higher receiver levels.

From a splitter that distributes light to subscribers and combines return light from the subscribers at a penalty, there can be a long link (e.g., up to 25 km with an additional 6 dB of loss) back to a headend or hub where the combined return sources are detected at a receiver. The total loss is high such that the receiver SNR is degraded. Furthermore, typically up to 8 receiver outputs are combined onto on CMTS return port that thus handles around 256 subscribers. In this combining, the receiver thermal noise adds up and unless means are implemented on the receivers to turn them off in the absence of signal the SNR is degraded by a further 9 dB. With such means the SNR is still degraded by up to 6 dB when up to 4 return transmitters are on simultaneously, a valid operation mode of the return network.

In embodiments, an active optical splitter with a splitter and wavelength selective components directs upstream light from output fibers at least one wavelength band to a multitude of detectors in the transmission line structure, and passes downstream light to and upstream light of other wavelengths from the output fibers and at least one upstream transmitter The phenomenon of optical beat interference (OBI) may occur in RFoG systems when two return transmitters hit a receiver simultaneously on the same wavelength. In a cable system, for example, the condition that cause OBI can easily occur in multiple-dwelling unit (MDU) applications of DOCSIS-based systems with bonded upstream channels. Optical Beat Interference (OBI) can occur, which is a signal degradation that occurs when two or more lasers with closely-spaced optical frequencies transmit simultaneously from two ONUs.

Figure 1B:
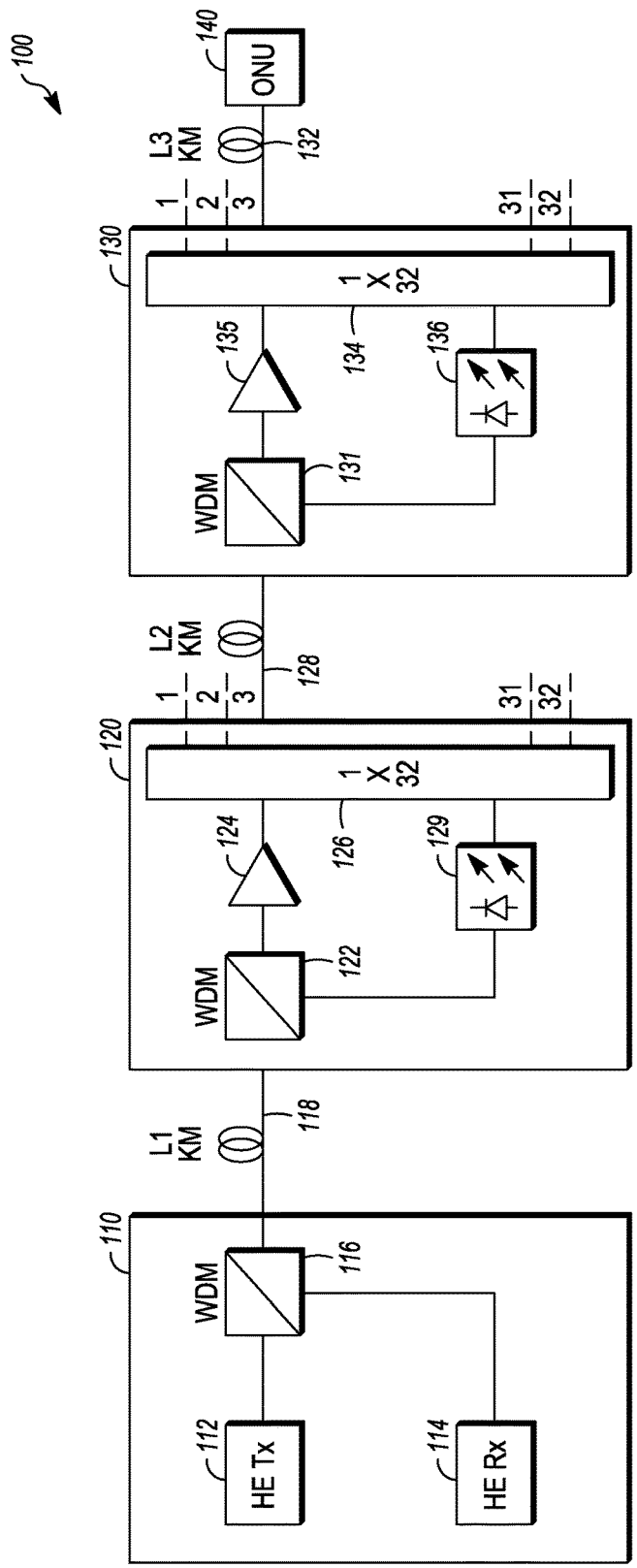
FIG. 1B shows an RFoG architecture improved in accordance with the disclosed techniques.

FIG. 1B shows an improved system 100 for delivering content, e.g., CATV content, to a plurality of subscribers over a network, such as the RFoG network that includes a transmission line receiver with cascading splitter/combiners. In example RFoG systems, the head end 110 delivers content to an ONU 140 at a customer's premises through a node. The system architecture in FIG. 1B is shown with a head end 110 having a transmitter 112 that outputs a signal to a fiber link 118 of L1 km for delivering a downstream signal to one or more splitters. The headend also may include a receiver 114 connected to a WDM splitter 116 that may receive a signal from a fiber link 118 of L1 km. The fiber link 118 is connected to an active splitter/combiner unit 120.

The example splitter/combiner unit 120 shown may include a WDM 122 that separates forward path signals from reverse path signals. As used herein, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end.

The forward path signal from the WDM 122 is provided to a higher power multi-port amplifier that distributes power. For example, FIG. 1B depicts a higher power multi-port amplifier that outputs an amplified optical signal to the active 1×32 splitter 126 that has 32 output ports to respective second fiber links 128. In embodiments, the higher power multi-port amplifier is an Erbium Doped Fiber Amplifier (EDFA) 124 that internally distributes power over the 32 outputs of the combiner 120, each output operated at a relatively high power, e.g. approximately 18 decibel-milliwatts (dBm). The WDM 122 may pass 1550 nm light from the EDFA 124 in the forward direction and direct reverser light, such as at 1610 nm or 1310 nm, in the reverse direction to the receiver in the headend 110.

At each port, the power level may be modest, e.g., in the 0-10 dBm range. The active splitter/combiner unit 120 may be located within a node and a plurality of active/splitter combiner units 130 (only one shown in FIG. 1B for purposes of illustration) may be connected to active splitter/combiner unit 120 over a short distance, such as 1-3 km or less through fiber 128. Each of the 32 ports of the splitter/combiner 126 output, through a respective fiber 128, a respective signal to a second active splitter/combiner unit 130 of the same type and configuration as the splitter/combiner unit 120. An example of an active splitter/combiner unit is ARRIS's AgileMax®© splitter/combiner unit. The length(s) of the fiber 128 may vary with respect to each other. The output power per splitter 130 port is low, around 0 dBm. The splitter ports are connected to ONUS, for instance in a Multiple Dwelling Unit (MDU) or a neighborhood, via fiber 132 of length L3.

In the reverse direction, either or both of the 1×32 port splitters 126, 134 may operate as an active combiner 126, 134. Each combiner 126, 134 may include (not shown) a WDM per port directing upstream light to a detector that converts the received optical signal to an electrical signal and amplifies it in the RF domain. As shown in further detail in FIG. 1B, element 126 is a passive splitter for forward signals and a transmission line receiver for reverse signals. The forward split function of splitter 126 is shown in more detail by elements 315, 335, and 340 in FIG. 3. Further, the reverse transmission line function of passive splitter 126 is depicted as 312c in FIG. 3, showing the splitter 126 receiving upstream signals that have been separated from downstream signals using WDMs 375, 379, etc. As described in more detail below, FIG. 3 shows receivers 311a and 311b illustrating additional upstream receivers not implemented as transmission line receivers, but provided with upstream signals from WDM 361 and 364.

The combiner 126, 134 may then provide the electrical signal to a transmitter 129, 136 that outputs light at, for example, 1610 nm, 1310 nm, or some other appropriate wavelength, provided to the WDM 122 or 170, which in turn directs the upstream light into fiber, such as fiber 128 or fiber 118. Thus, along the return path from the subscriber's ONU 14 to the head end, a splitter/combiner 130 may operate to combine signals in the reverse direction for upstream transmission along fiber length 128, and a splitter/combiner 120 may operate to combine signals in the reverse direction for upstream transmission along fiber length 118. The combined signals may be transmitted upstream to a Cable Model Termination Service (CMTS) in the head end 110. Combined with the forward power limit on the fiber, the combined signals may require one forward fiber (L1 km) per group of 32 subscribers. At the head end, the fiber 118 is connected to WDM 116 that directs the upstream light to the receiver 114.

Optical networking units (ONUs) 140 in an RFoG environment terminate the fiber connection at a subscriber-side interface and convert traffic for delivery over the in-home network at the customer premises. Coaxial cable can be used to connect the ONUs of an RFoG network to one or more user device, wherein the RFoG user devices can include cable modems, EMTAs, or set-top boxes, as with the user devices of an HFC network. For example, the R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections.

The ONUs 140 convert the forward transmitted light to RF signals for the in-home coaxial network. The ONUs 140 also receive RF signals from the in-home network and modulate these signals onto a laser, operating at 1610 nm for example, and the laser's output is sent upstream into the fiber L3. The upstream signal is combined with other upstream signals in the combiner 134 and/or combiner 126 and transmitted further upstream in fibers L2 and L1. At the WDM 122 the upstream signals are directed towards the head end receivers 114 over fiber L1.

The sum of the fiber lengths L1+L2+L3 is up to 25 km. The system 100, however, will permit a higher total length of fiber between the head end and the ONUs, such as 40 km, because the system 100 can tolerate a higher SNR loss, as further described below.

The upstream signals from the ONU 140 are individually terminated directly at the active splitter/combiner unit 130; even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110. Although the repeated re-transmission leads to some incremental reduction in SNR, improvements in SNR from the active architecture provides much greater overall performance relative to traditional RFoG systems. More importantly, because all reverse signals are individually terminated at separate detectors, such as a multiple detector receiver as described in patent application (TBD), there can be no optical beat interference (OBI) between different reverse signals. The reverse signals are not combined optically, hence OBI cannot occur.

In the forward direction there may be multiple EDFAs 124; these EDFAs are cost effective single stage devices with low power dissipation—typically 2 Watts or less. Cascading the EDFAs results in an accumulation of noise due to the finite noise figures of the EDFAs. Whereas the active splitter architecture does not require the EDFAs (the high power head end 110 EDFA could still be used to provide power to the ONUs 140) the use of EDFAs inside the active splitter units may provide some advantages. For example, the complexity and power dissipation of equipment in the head end 110 is greatly reduced, as is the fiber count emanating from the head end 110. The amount of power delivered to the ONUs 140 is readily increased to approximately 0 dBm. As a consequence, ONU receivers obtain 12 dB more RF level from their detectors and do not need as high an SNR or gain. Even with relaxed SNR requirements at the ONU receivers, permitting a higher thermal noise contribution of the receivers, the SNR impact due to EDFA noise is easily overcome due to the higher received power. In addition, additional spectrum can be supported in the forward direction with an acceptable SNR relative to current architectures, such as 4 GHz instead of 1 GHz in current RFoG, hence total data throughput rates can grow significantly without a change in operation to permit for example, services that provide 40 Gbps download speeds and 10 Gbps upload speeds.

In embodiments, the optical combiner(s) 120, 130 provides upstream and downstream RFoG capability and a completely transparent and reciprocal avenue for PON transmission. The optical combiner(s) 120, 130 may enable complete transparency for PON deployments. For example, the optical combiner(s) 120, 130 may enable OBI free and high capacity features by deployment in compatible HFC D3.1 capable FTTH networks. Likewise, the optical combiner 120, 130 may be incorporated in to GPON, 1G-EPON, XGPON1, 10G/1G-EPON, 10G/10G-EPON. The compatibility with HFC and D3.1 enables the disclosed optical combiner(s) 120, 130 to be deployed alongside a current HFC network, and is D3.1 ready. The optical combiner(s) 120, 130 may be deployed on a fiber node, on multiple dwelling units (MDU) and on single family home (SFU) deployments.

The optical combiner 120, 130 may be independent of ONUs, Cable Modems and CMTSs. The optical combiner 120, 130 may be CMTS agnostic, thus relieving the burden of creating an RFoG aware scheduler that is both restrictive and time consuming. The optical combiner 120, 130 assists to make a cable version of FTTH more feasible, as compared to the PON alternatives. For example, in embodiments, the optical combiner 120, 130 has a reciprocal PON Pass thru capability of the optical combiner 120, 130 along with a high upstream and downstream capacity, which assists RFoG deployment without interruption to the underlying system or impairment to future inclusion of PON functionality, such as later PON deployment on an RFOG system.

Traditional RFoG and PON networks have a fixed power budget. This means that a longer reach results in lesser splits and a larger split results in shorter reach. This reach/split combination is a fundamental limit of these networks. The disclosed embodiments may enable both a longer reach and a larger Split. Thus, embodiments are described that may advance FTTH topology and make FTTH deployment feasible.

In embodiments, the optical combiner 120, 130 has 32 ports, but only requires one transmit port, one receive port, and one WDM component at the headend 110. Thus, instead of requiring 32 WDMs and 32 receive ports, the optical combiner may save on head end space and power. The combiner 120 may be an active device that needs approximately 2 Watts of power. The optical combiner 120 may be powered by power sources readily available in the RFoG system, or power can be provisioned in to the optical combiner. The power source may include a battery back-up or solar/fiber power alternatives. If the power is lost and the battery has also drained, the entire reciprocal PON transmission is unaffected. The upstream RFoG transmission is however stopped. In a conventional RFoG system it would have been stopped also because the preponderance of OBI would have severely impaired the system anyway if the system was a traditional RFoG system with a passive combiner. Also in case of a power loss ONU (Optical Networking Unit) at the homes would cease to function such that without any power backup such systems will cease to function, whether those are RFoG or PON systems, with or without the active combiner disclosed here. The headend optical receiver may only need an input power range from 0 . . . −3 dBm, and require 15 dB less RF output power due to the absence of the RF combiner such that with such a high optical input power and low RF output power requirement the gain can be low.

Embodiments for an RFoG combiner include preventing or eliminating OBI at the combiner as opposed to managing it at the extremities of the network (such as using a CMTS scheduler at the headend side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks. The optical combiners 120, 130 may eliminate OBI, making an OBI-free forever system. The optical combiner 120, 130 may be ONU-independent, CM-independent, and CMTS-independent. The optical combiners 120, 130 enable long reach and large splits, e.g., up to 40 km and 1024 Splits, which will expand even further. The high upstream and downstream capacity enabled by the optical combiner 120, 130 includes up to 10G DS/1G US, and as high as 40G DS/10G US.

The architecture such as that shown in FIG. 1 B may minimize or eliminate optical beat interference (OBI) and therefore reduce the OBI impact on signal to noise (SNR) in radio frequency (RF) over fiber (RFoG) networks, while at the same time permitting operation of passive optical networks (PON), providing a hybrid PON (HPON) solution. However, active elements are still used to amplify upstream traffic. Thus, while cascading multiple units 120, 130 may provide very high split ratios, there is also an accumulation of gain uncertainty in the cascaded links. The gain uncertainty can be so high that the signal to noise advantage of the improved architecture is lost. In some implementation, the architecture is designed to have up to two splitter units, e.g., up to two 1×32 units cascaded, 32 such that 1×32 at each port of the first unit results in up to 1024 split. For example, the architecture may include cascading multiple active splitter/combiners, each handling 16 or 32 splits to create subscribers groups of 256 to 1024 subscribers on one fiber, which is much larger than the typical service group size for RFoG or PON (Passive Optical Network) (32 to 64 subscribers).

However, many networks have been built with a PON architecture in mind including 1×4 or 1×8 splitters in the field. In order to accumulate a large number of subscribers such an architecture requires cascading of a large number of active splitters. Thus, in some networks implementing the architecture described in FIG. 1B, multiple 1×4 or 1×8 splitters are cascaded. The result is cascading a large number of splitter/combiner units, for example more than 8 in a cascade, which results in a large gain uncertainty for upstream traffic and thus a loss of signal to noise margin. Because each splitter/combiner unit 120, 130 receives and re-transmits an optical signal that may originate from another splitter or from an ONU (Optical Networking Unit) located at a home or at a small node, the unit 120, 130 has a gain that is controlled by the average input power to the ports. And as a consequence, the gain may vary for multiple re-transmissions through each splitter 120, 130. The overall gain variation may be large such that system margin may be impacted.

Disclosed herein are techniques for a trunk and drop architecture. The trunk and drop expands the cascading splitter/combiner architecture with one or more trunk receivers that permit individual gain control, the gain being controlled such that for multiple units cascaded along a trunk line a precise overall gain can be maintained.

Figure 1C:
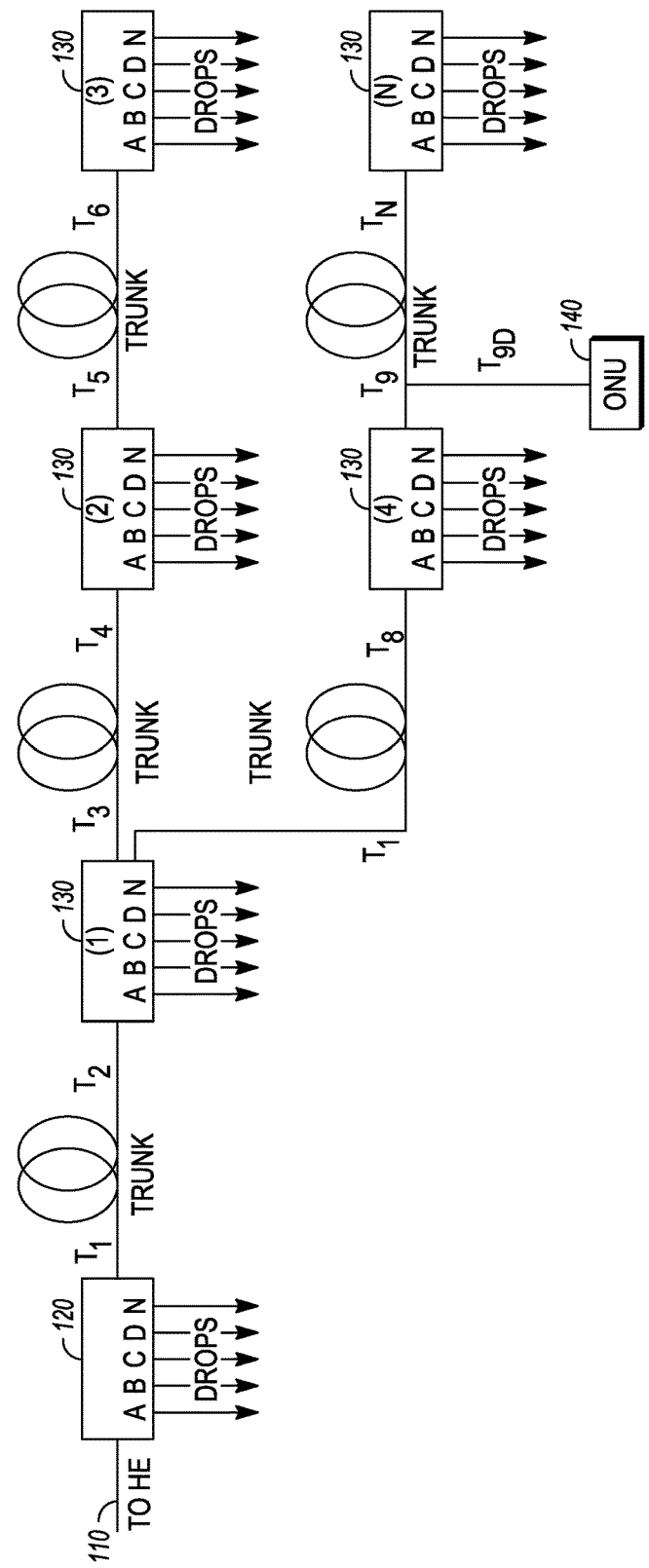
FIG. 1C illustrates a trunk and drop architecture.

FIG. 1C illustrates a trunk and drop architecture. The trunk and drop architecture has a fiber to the headend and multiple splitter/combiner units 120, 130 in cascade. The splitter/combiner units 120, 130 have both drop ports, shown as A, B, C, D . . . n on each of the splitter/combiner units 120, 130, where each splitter/combiner unit may have one or more drop ports. The drop ports extend to ONUS. The splitter/combiner units 120, 130 are also depicted with trunk ports $T_1$ . . . $T_n$ connecting each unit with at least one other splitter/combiner units 120, 130. A splitter/combiner unit 120, 130 may combine upstream signals and re-transmit them on an upstream laser that is connected to a trunk port of a preceding splitter/combiner in an upstream path towards the HE (headend) 110. For example, splitter/combiner unit 130(1) may transmit from trunk port $T_2$ to splitter/combiner unit 120's trunk port $T_1$, which can re-transmit the upstream signals to the headend 110.

Each splitter/combiner unit 120, 130 may also split downstream signals and provide part of the signals to trunk ports and part of the signals to drop ports. For example, splitter/combiner unit 130(1) may split downstream signals in a downstream path using trunk port T1 and trunk port T7 to splitter/combiners 130(2) and 130(4), respectively. Splitter/combiner unit 130(1) may also split downstream signals to the drop ports A, B, C, D . . . n on the splitter/combiner unit 130(1). A ratio may be determined for splitting power to the drop and trunk ports.

Downstream signals may be distributed over drop and trunk ports. Signals may be coupled to trunk ports in a manner to preferentially obtain a better SNR on trunk ports. For example, in the downstream, a ratio may be determined for splitting power to the drop and trunk ports to improve SNR on cascaded trunk ports. The power split ratio may be set such that power is preferably directed to trunk ports to enable sufficient SNR on a cascade of trunk ports. The disclosed techniques offer a manner for obtaining a better SNR, where higher optical power may be used on a receiver (such as a trunk port). If a given amount of power is available, then the consequence of allocating more power to a trunk port is that less power is available for drop ports, such that the drop port SNR degrades. Thus, based on the disclosed techniques, power may be allocated between the trunk and drop ports to optimize the SNR.

As shown in the example configuration of cascading splitter/combiner units in FIG. 1C, for example, units 120, 130 may have dedicated trunk and drop ports. The drop ports may be intended to transmit to ONUs and the trunk ports may be intended for re-transmission through multiple splitter/combiner units 120, 130. Additional trunk ports may be provided in addition to drop ports. As shown in the example configuration in FIG. 1C, up to two or three "trunk" ports are provided for each splitter/combiner unit in addition to the "drop" ports. The embodiment depicted in FIG. 1C is shown by way of example, but is not meant to be limiting. Rather, it should be understood that different arrangements of splitter/combiner units and varying numbers and arrangements of trunk ports and drop ports are possible for implementing the disclosed techniques.

Upstream gain may be controlled by using a reference RF signal with known optical modulation index transmitted in upstream direction. A splitter/combiner unit 120, 130 may transmit the reference signal along with other upstream signals in the upstream direction. A preceding splitter/combiner unit 120, 130 may receive the upstream signal at the trunk port and re-transmits the upstream signal. In the process, the re-transmitting splitter/combiner unit 120, 130 may detect the reference signal and adjust the upstream gain such that at re-transmission of the upstream signal the known optical modulation index is obtained for the reference signal. Such use of a reference signal to adjust upstream gain enables the splitter/combiner unit to manipulate the optical modulation index before and after re-transmission to be identical. A splitter combiner unit 120, 130 may internally create a reference signal and transmit that with known optical modulation index in case no reference signal is received at a trunk port. In case a reference signal is received at a trunk port a splitter/combiner unit 120, 130 may not internally create a reference signal but instead just re-transmit the reference signal received with the known optical modulation index.

For trunk ports T1 . . . Tn, the splitter/combiner unit 120, 130 may have individual gain control per port. The gain control may depend on a trunk port input optical level or a trunk port radio frequency (RF) signal level for a reference signal. For example, trunk port T1, comparable to 362 in FIG. 3, receives an upstream signal passed via WDM 361 to receiver 312a, followed by adjustable gain attenuator 311a. Another trunk port 364 via WDM 364 receives via 312b and is followed by an adjustable gain attenuator 311b. Thus, these individual ports have adjustable gain before they are combined into one signal at combiner 308. There is also a combined drop port signal that is provided to adjustable gain attenuator 311c, providing an average gain for the upstream signals of drop ports connected to combiner 312c.

In case the gain is a function of the trunk port optical level, then the RF gain may be changed such that the RF gain factor is inversely proportional to the optical power received, where the optical power received is measured by measuring the detector current of the receiver receiving that optical power (such as the detector in 312a or 312 b).

In case the gain is a function of the level of an RF reference signal, then the gain factor is inversely proportional to the RF amplitude of the reference signal received by a receiver such as 312a or 312 b. In a feedback system an RF reference signal level monitor after adjustable gain attenuator 311a/b (i.e., to the left in FIG. 3 as upstream signals go right to left) and the adjustable gain may be adjusted to keep the level observed by the monitor(s) constant. Thus, the adjustable gain would vary inversely proportional to the RF reference signal amplitude(s) from receiver(s) 312 a/b.

In accordance with the disclosed techniques, it is noted that FIG. 1C trunk connection T1 corresponds to trunk connection 362 in FIG. 3, and trunk connection T6 corresponds to trunk connection 301 in FIG. 3.

As shown in FIG. 1C, the splitter/combiner unit may include both a trunk fiber(s) and a drop fiber(s), where as described below the splitter/combiner may control upstream gain on a respective trunk port.

For example, the gain per trunk port may be controlled to maintain a precise overall gain through a large number of splitter/combiner units 120, 130 cascaded in a trunk and drop architecture, such as that shown in FIG. 1B. The drop ports, A, B, C, D . . . n of a respective splitter/combiner unit, on the other hand, may only have an average gain control for a large number of ports. As described herein, the elements 311a/b represent individual gain control for trunk ports, such that for each received signal 312a/b the gain can be controlled precisely. Element 311c represents a gain control for all the inputs of 312c, so there may be only one gain control for all the inputs that come from the drop ports.

A radio frequency (RF) gain of upstream traffic on the drop ports may be switched on or off depending on a presence of upstream traffic on the drop fiber. For example, upstream traffic may be detected by photodetector currents on the one or more drop ports. If upstream traffic is detected, the RF gain of an individual drop port may be switched on, and if upstream traffics is not detected, the RF gain of the drop port may be switched off.

In embodiments, the trunk ports always have upstream gain, independently of whether the drop ports are active or not. For example, the upstream laser may remain active while the drop ports are switched on and off. Referring to FIG. 3, for example, the upstream receiver 312C has a finite noise figure thus it adds noise even when no upstream optical signal is received. This may be suppressed when no upstream optical signal is received by switching off the upstream optical gain when no upstream optical signal is received. Thus, a trunk port optical power may always be present and the RF gain is never turned off so the trunk port collects a signal from many cascaded units, where an upstream signal is always present. Since an upstream signal is cascaded through many upstream trunk sections, in such embodiments it may be desirable to have multiple instances where the same signal is switched on and off, else the signal may cause an unacceptable signal degradation. The upstream gain control per trunk port is based on optical power level or RF reference signal level, as described herein.

In embodiments in which the drop port upstream signals are received and result in a single electrical signal, e.g., on 312c, only one common (average) gain is applied to those signals. The signals input to 312c come direct from the ONUS and may have reasonably identical signal levels such that the deviations are small. On the trunk, however, signals have been re-transmitted many times. If small deviations exist at each re-transmission, then the gain error would accumulate and become large. Also the loss from splitter to splitter (fiber length) may vary and therefore the required gain for a trunk port varies from trunk to trunk connection. The gain for trunk ports is generally very different for the drop ports. A common gain for trunk and drop ports is not practical in such scenario, and thus a common gain across different trunk ports may not be preferable.

In a drop port, where an individual user or customer premises device may be connected, the user may not constantly provide a signal but instead occasionally send a burst of upstream traffic. However, the drop port may contribute noise unless the gain of the drop port is switched on or off. This would differ from a precise gain control, where precise gain control is for all the upstream ports combined (such as in 311c). However, an on/off function on a per-port basis (such switches are not shown in FIG. 3) could provide some gain control. Thus, a signal traveling from a customer in upstream direction may encounter a switch event when passing the drop port to which it is connected. After that the signal may pass by the trunk ports without further switch events. Since a user is mostly not transmitting the switch is mostly off, thus most of the noise from the individual customers does not enter the system.

In described above, in embodiments the upstream laser is always active. As shown in FIG. 3, such laser may be laser 305, where such laser 305 may always be on and no RF gain switching is performed. The upstream laser 305 may always be on. Laser 305 could also be operated in burst mode, transmitting only when upstream optical signals are received and re-transmitted. However in a cascade of multiple splitters/combiners, the cascade of lasers would need to turn on when an upstream optical transmission is initiated. Because the timing of turning on so many lasers in cascade is difficult to achieve, it may be desirable in embodiments to keep the upstream laser 305 on all the time.

In embodiments, the trunk ports may be used as drop ports when used with ONUs. By detecting an input power state at the trunk port, and the difference between on/off power states, trunk ports may detect if they are connected to preceding splitter/combiner units 120/130 or if they are detected to ONUs. If an ONU connection is detected, the trunk port may behave as a drop port. Thus, the trunk port may have dual functionality. A trunk port when used in this capacity may receive a constant high optical input power (e.g., input power to receiver 312a/b when trunk signals are not switched on or off between power states). In an embodiment in which a trunk port is connected to an ONU, the trunk port will identify a changing input power state, high when the ONU transmits and low in between. The changing input power state can be used by the trunk port to determine if the trunk port is connected to an ONU or not. In an embodiment where the trunk port has dual functionality (e.g., also used for a drop application), the trunk port may be able to detect the difference in the connection (and therefore which functionality) between on/off power. In contrast, drop ports primarily function to signal with ONUs, and thus will detect the high and low input power states.

As described above, detecting whether power is (occasionally) present or not, the presence of a connection can be determined. In a burst operation (typical for ONUs on a drop port), the burst operation implies that the ONU will occasionally transmit in upstream direction. In case no upstream transmission is detected at a port over longer period of time, a maximum time interval may be defined at which point the port is considered "not connected". In case a continuous input signal is detected then the port can be considered to be connected to a trunk port.

The trunk port behaving as a drop port may be used to calculate an average gain control for a large number of ports, similar to a drop port's average gain control. The splitter/combiner units 120, 130 may detect if an ONU or another splitter/combiner unit 130 is connected to the port to determine whether to revert the use of the trunk port to a drop port, or revert the use of a trunk port as a drop port back to a trunk port. An example is shown in FIG. 1C, where trunk port T9 behaves also as drop port T9D when the connection from splitter/combiner 130(4) in the upstream is also to ONU 140. Thus, splitter/combiner unit 130(4) may revert between trunk port and drop port functionality, and the splitter/combiner 130(4) may determine an average gain control for ports A, B, C, D . . . n of 130(4) and T9D.

In implementations where the splitter/combiner units have one port switch that switches between trunk and drop functionality, then only the last unit(s) in a cascade will be switched for drop functionality as the remaining splitter/combiner units will be switched in to a trunk functionality mode to connect to each other. For example, in FIG. 1C, splitter/combiner units 130(3) and 130(N) may be the only units with ports that function as drop ports, being the last units in the cascade before extending to an ONU. In such a scenario, the splitter/combiner 130(3) and/or 130(N) may determine an average gain control for ports A, B, C, D . . . n of and the port functioning as a drop port.

While a trunk port can switch between trunk and drop functionality, in embodiments a drop port does not and instead operates in either one or the other mode depending on whether an ONU is connected or another splitter/combiner. FIG. 1C shows both an ONU and a splitter/combiner 130 (N) simultaneously connected to port T9D. The splitter/combiner 130(4) may have two trunk ports as with splitter/combiner 130(1), T1 and T3. In such a case, line T9D would not emanate from T9 but instead be pulled directly from splitter/combiner 130(4) (as for 130(1)). Thus, in an implementation with one trunk port, the switch between trunk and drop functionality would occur only at the last unit because the other units are using their trunk port to connect to each other. In an implementation where at least two ports are trunk capable it is also possible to use one of the trunk port of intermediate units as a drop port instead of as a trunk port going to another unit.

In embodiments, the trunk ports T1 . . . Tn may be equipped with high performance low-noise receiver front-ends in order to reduce the accumulation of noise in a cascade of splitter/combiner units 120, 130. Such ports may also be designed to operate at high input power to further improve the signal to noise ratio on such trunk connections.

In embodiments, the trunk ports use pilot tones to provide precise modulation index calibration. For example, in the network shown in FIG. 1C, a pilot tone may be transmitted in upstream direct from a second unit 130(x) to a first unit 130(y), such as from 130(2) to 130(1). The pilot tone may have a defined optical modulation index. The upstream transmission including the pilot tone is detected by the first unit that re-transmits the signal including pilot tone further upstream. In the upstream transmission, the gain may be adjusted such that the pilot tone retains the same precise optical modulation index. Thus, as a result, re-transmissions can occur while maintaining a precise optical modulation index, even if optical loss varies. Trunk ports may be equipped with enhanced Element Managing System (EMS) features compared to drop ports. EMS is an over-arching term describing the communication of status information, and such EMS functionality may enable trunk ports to support the transmission of status information between units.

In embodiments, signals from drop ports may be added to signals from trunk ports and provided to an output laser that is transmitting upstream. For example, signals received at drop ports A, B, C, D . . . n at splitter/combiner 130(2) may be combined with upstream signals received at trunk port T5. Then, the splitter/combiner's 130(2) laser may transmit the combined output upstream over trunk port T4. In embodiments, drop ports are arranged in a transmission line receiver structure with an RF switch or a gain-switched amplifier to suppress thermal noise accumulation on unused drop ports. More details of an example transmission line receiver structure contemplated by the present disclosure for incorporating the disclosed techniques are described in U.S. application Ser. No. 14/679,235, which is hereby incorporated by reference.

Figure 2:
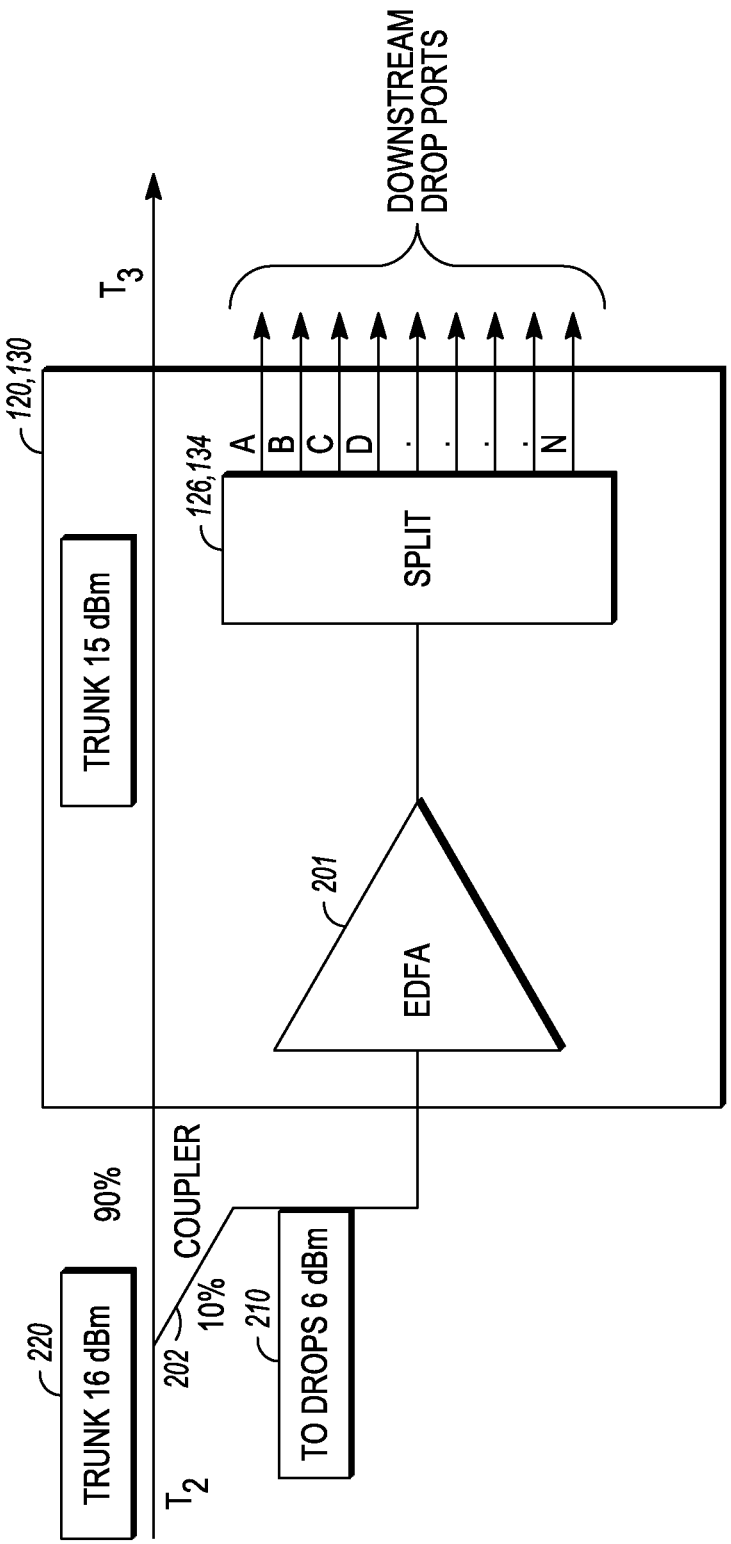
FIG. 2 shows an example of a splitter/combiner unit with an EDFA amplifying signals to downstream drop ports while passing a significant amount of power to a trunk port.

FIG. 2 shows an example of a splitter/combiner unit 120, 130 with an EDFA, such as 124, 135 from FIG. 1C, with the splitter/combiner unit 120,130 amplifying signals to downstream drop ports A . . . n, while still passing a significant amount of power to a trunk port. In view of FIG. 1C, Trunk 17 dBm can enter splitter 120 with 16 dBm outputting to splitter 130(1). And T2 (TRUNK 16 dBm) input to 130(1) shown in FIG. 1C may be output on T3 as TRUNK 15 dBm to unit 130(2). As shown in FIG. 2, drops A . . . n in 130(1) correspond to drops A . . . N shown in FIG. 2. The EDFA, positioned in the downstream position in the splitter/combiner unit 120,130 before the splitter 126, 134. It should be noted that FIG. 2 depicts the downstream portion of the splitter/combiner unit 120, 130, which are shown in more detail with both upstream and downstream portions in FIG. 1C and FIG. 3. The EDFA 124, 135 from FIG. 1C, for example, provides downstream amplification and the split function.

In the downstream, it may be desirable to split power to drop and trunk ports based on a ratio that improves SNR on the trunk ports between the cascased splitter/combiner units. Further, EDFAs may be implemented to amplify signals independently among the different port types. As described in more detail below, FIG. 3 shows an EDFA 325 that feeds or outputs to the ports of type "drop", such as drop 1 371, drop 2 376, and drop N 380. Not shown in FIG. 3 is another EDFA that may be placed in the line to the smaller split 335 to the left of the bigger split fed by the EDFA 325. Such a second EDFA could follow split 315 and be used to amplify the output for feeding the trunk ports, such as trunk 1 362 and trunk 2 366.

FIG. 2 illustrates an embodiment for amplifying downstream signals with EDFAs to increase port and/or trunk signal levels. Where a single splitter/combiner unit 130 is shown by way of example, launching a trunk downstream having a first signal level (shown as 16 dBm in this example) from an upstream splitter/combiner unit may provide a portion of that signal (e.g., 4-6 dBm, shown as 6 dBM in this example) to EDFAs (only a single EDFA 201 is shown by way of example) feeding downstream drop ports for multiple splitter/combiner units. The power may be split to the drop and trunk ports based on a ratio that improves SNR on the cascaded trunk ports. For example, up to 8 splitter/combiner units in cascade may properly function by selecting appropriate split ratios at the couplers. As shown in FIG. 2, coupler 202 ratio can be selected to direct more power to the trunk output T3 (90% in example) or to the drops (10% in the figure example). In FIG. 3 splitter 315 corresponds to coupler 202. It is noted that the words coupler and splitter are often interchangeably used in fiber-optics.

The connector interfaces between trunk and drop ports may be configured for relative loss. For example, the loss passing through splitter 315/340 (drop ports) can differ from that for passing through 315/335. In other words, the loss may be different between the drop and trunk ports.

As described above, EDFAs may be included to amplify signals independently among the port types. For example, each downstream splitter/combiner may couple a fraction of the signal to an EDFA 201 amplifying a signal provided to the drops, which may then be split to drop ports A, B, C, D . . . n. Alternately, or in combination, a trunk signal level may be chosen very high at a first splitter/combiner such that each downstream splitter/combiner may couple a fraction of that signal to drop ports A, B, C, D . . . n, with or without the use of an EDFA. In other words, a downstream signal into a splitter/combiner is "by definition" a trunk signal, the additional statement here is that the level can be chosen high. And indeed an EDFA may or may not be used. To describe FIG. 2 in the context of FIG. 1C, refer to splitter/combiner unit 130(1) from FIG. 1C as being the splitter/combiner unit shown in FIG. 2, T2 corresponding to the trunk 16 dBM, shown in FIG. 2 as an input to the splitter/combiner 130. As also shown in FIG. 2, a coupler 202 may direct a portion 210 of the 16 dBm trunk signal to the splitter/combiner 130 for amplification by the EDFA 201, the amplified signals provided to the splitter 134 for splitting and then outputting through each of the downstream drop ports A . . . n. The signal portion 220 remaining after signal portion 210 is directed towards the EDFA, is output via trunk T3 in this example. In this example, a 10/90 ratio is used for the coupler 202. Thus, because the EDFA may amplify the input for splitting to the downstream ports, a smaller portion of the trunk signal T2 may be directed towards the EDFA, leaving a larger portion of the incoming trunk signal T2 remaining for transmission via trunk T3. Thus, the signal portion 200 may be a high power output relative to the input power, shown as 15 dBm in this example. By using an EDFA, signals may be provided to the splitter/combiner 130 for transmission to ONUS via the drop ports, while signals may also be passed to the next splitter/combiner 120,130 in the cascade of splitter/combiner units 120, 130 with significant power. As explained above, the EDFA 325 amplifies signals to drop ports, as shown in FIG. 3. An EDFA amplifying signals to trunk ports is currently not shown in the figures, but could be included before split 335 for amplifying signals too trunk ports. In FIG. 1 A/B the distinction between trunk and drop ports is not specifically shown. FIG. 1C as insufficient detail. In FIG. 2 the EDFA would be added in the line going to T3 and in FIG. 3 the EDFA would be added between splitter 315 and splitter 335, amplifying light from splitter 315 to 335.

Downstream signals to trunk ports may be amplified with an EDFA or may not be amplified with an EDFA independently of whether downstream signals to drop ports are amplified. This is provisioned to prevent the accumulation of ASE (Amplified Spontaneous Emission) noise due to multiple EDFAs in cascade; it may be preferable to limit the number of EDFAs cascaded on a trunk signal. In some implementations, an advantage of using an EDFA in the trunk ports is higher optical signal levels, but since each EDFA may contribute noise (the ASE), a cascade of many EDFAs may cause high ASE. Thus, it may be desirable to limit the number of cascaded EDFAs, and it may not be desirable to use an EDFA at each trunk port. This is different for drop ports, drop ports are terminated at ONUS, thus not followed by more EDFAs. Therefore one may often want to use an EDFA for the drop ports, while not using one for the trunk port. EDFAs in splitter/combiner units may be remotely pumped by upstream splitter/combiner units.

An EDFA may be used to amplify a signal in a trunk fiber to ensure enough level is provided to a following splitter/combiner unit. For example, in a scenario in which there are multiple trunk fibers emanating from a splitter/combiner unit (e.g., splitter/combiner 130(1) in FIG. 1 C), there is a reason to be able to provide gain on the trunk fiber as well. While FIG. 2 depicts a simple cascade with only two branches splitting from multiple legs, the network of trunk and drop ports may be much more complex. Some flexibility in the design of the splitter/combiner is desirable to accommodate these cases while preserving the splitter/combiner ability to pass PON signals as well. When splitting the trunk into multiple outputs, the downstream signal power is distributed over multiple legs, so the optical signal level drops. If the optical signal level drops too much an EDFA can be used to recover the level, at the cost of the aforementioned increase to ASE due to the EDFA. It depends on the scenario whether the EDFA is required desired or not.

FIG. 3 depicts an example design for a splitter/combiner unit 120, 130 usable in the trunk and drop architecture. FIG.

Figure 4:
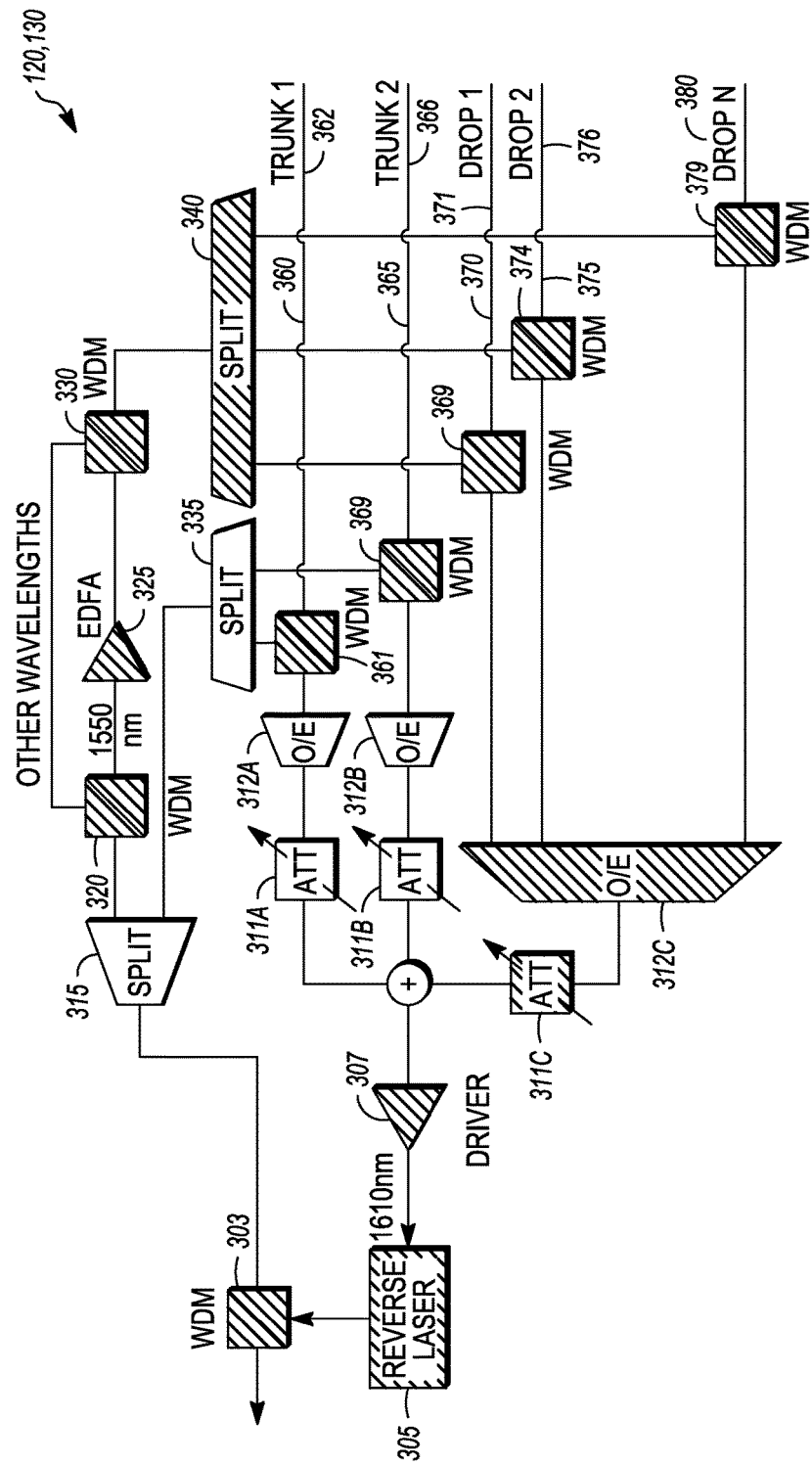
FIG. 4 shows the difference between a normal splitter/combiner unit from a splitter/combiner unit with trunk and drop fibers.
Figure 5:
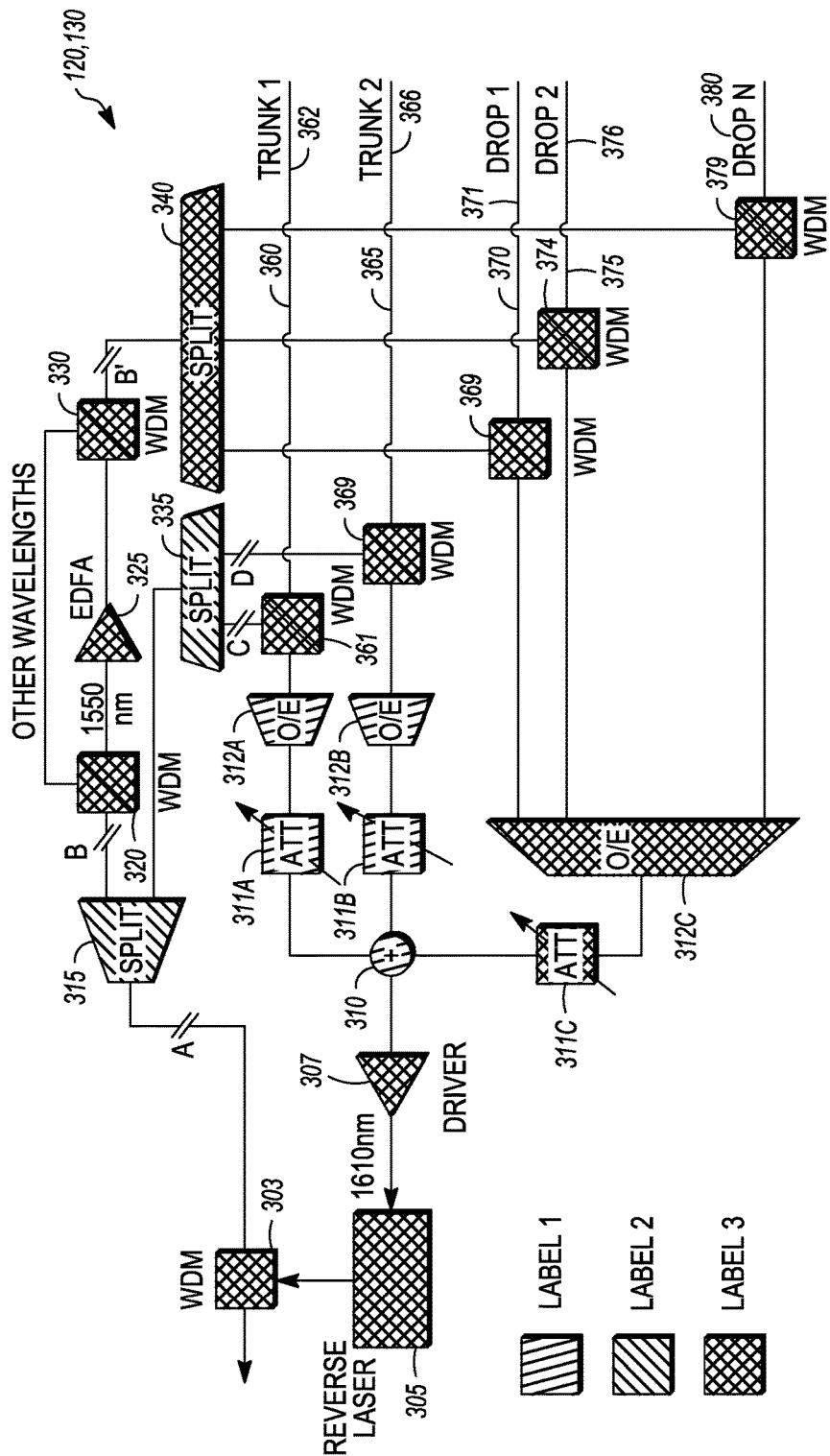
FIG. 5 illustrates interfaces and changeable components as compared to FIG. 4 to configure a splitter/combiner suitable for trunk and drop architectures.

4 shows another embodiment for a splitter/combiner 120, 130, exemplifying the difference between the splitter/combiner unit shown in FIG. 3 from a splitter/combiner unit with trunk and drop fibers. FIG. 5 illustrates interfaces and changeable components as compared to FIG. 4 to configure another embodiment for a splitter/combiner unit 120, 130 suitable for trunk and drop architectures. It should be understood that each of these designs are shown by way of example, and different configurations are contemplated that are within the context of this disclosure. For example, additional O/E converters, trunks or drops may be implemented into a splitter/combiner design, and FIGS. 3, 4, and 5 are non-limiting examples.

Referring to the example configuration depicted in FIG. 3, the unit 120, 130 has a fiber upstream connection 301 to the left and downstream fiber connections 302a . . . n to the right. The first element shown in the downstream path is a WDM 303 that may combine upstream traffic. A WDM may multiplex a number of optical carrier signals onto a single optical fiber by using different wavelengths of laser light. A WDM may enable bidirectional communication over one strand of fiber, as well as multiplication of capacity. For instance, a 1610 wavelength is shown traveling upstream towards the WDM 303, which may be combined in the WDM 303 with downstream traffic at other wavelengths. FIG. 1B's WDM 122 may function as WDM 303 in FIG. 3 in accordance with the disclosed techniques.

Upstream traffic may be provided by a laser 305 driven by a laser driver 307. It is also noted that FIG. 1B's reverse transmitter 129 may function as the transmitter 305 in FIG. 3 with a driver 307, in accordance with the disclosed techniques. The laser driver 397 may be provided an electrical signal 308 summed at 310, the signal 308 representing a sum of multiple optical to electrical (O/E) converter outputs, such as outputs from O/E converters 312a, 312b, and 312c. The O/E converters 312a, 312b, and 312c may consist of multiple input O/E converters such as a transmission line receiver of a splitter/combiner unit. Preferably 312a, 312b are high performance receivers and may be implemented as individual receivers. However they could also be implemented as a transmission line or other multiple input receiver. Receiver 312c has a larger number of inputs and may not be implemented with individual receivers.

An optical combiner unit may implement a transmission line approach to combine multiple optical photodetectors in a single optical receiver, such as that shown by OE converter 312c. The transmission line approach be accomplished in unidirectional or bidirectional configurations. In a unidirectional system, there may be no control communication signals from an active optical splitter to an ONU if control communication signals only pass from an ONU to an active splitter. Thus, in a unidirectional system, an active optical splitter may simply accept an output level from an ONU and operate with that output level. A bidirectional system may pass control signals from an active optical splitter to ONUs and instruct them to adjust their output power. A bidirectional system of this type may enable accurate equalization of the input levels to the active optical splitter from each ONU. It is noted that FIG. 3 does not show bidirectional control signals, it depicts receiver 312C receiving upstream information. In a splitter with bidirectional control there also must be an element transmitting downstream information so that the splitter can communicate with the ONU.

In embodiments, there may be one or more single input O/E converters 312a, 312b, and 312c. Each O/E converter 312a, 312b, and 312c may be followed in the upstream path by a variable attenuator 311a, 311b, 311c, respectively, that can be used to control the signal level to the laser driver 307. The transmission line receiver 312c is provided with multiple inputs from drop fiber connections 370, 375, and 380. In each drop there is a WDM 369, 374, and 379, respectively, that may combine forward traffic with reverse traffic. Reverse traffic (traffic delivered in the direction shown by arrow 390) from drop fibers 370, 375, and 380 is directed to the transmission line receiver 312c by the WDM units 369, 374, and 379. Forward traffic (traffic delivered in the direction shown by arrow 395) from a splitter, such as splitter 340 may also be directed to the drop fibers 370, 375, and 380 by the WDM units 369, 374, and 379. Further WDM units 361, 364 may direct reverse traffic from trunk fibers 362 and 366 to single O/E units 312a, 312b that may have individual attenuator or gain control by attenuators 311a, 311b, respectively. These WDM units 361, 364 may also direct forward traffic from one or more splitters 335 to trunk fibers 362, 366. The WDM units 361, 364, 369, 374, and 379 connected to trunk and drop fibers 362, 366, 371, 376, 379 may also direct upstream light at wavelengths not directed to O/E converters to the splitters 335 or 340 connected to the WDMs units 361, 364, 369, 374, and 379 such that these splitters 335 or 340 combine the wavelengths of upstream traffic.

Splitters for forward traffic may be preceded in the downstream path by EDFAs 325 amplifying forward light. Further WDM units 320 and 330 may direct light at wavelengths that are not amplified by EDFA units 325 around the EDFA units 325, thereby bypassing certain wavelengths around the EDFA units 325. For example, the WDM may include filters that identify certain wavelengths to be directed down a first path or a second path. The WDMs 320, 330 may also direct upstream traffic around EDFAs. Trunk and port fibers may have individual EDFAs (not shown) or no EDFAs as needed. FIG. 1B's EDFA 124 may function as EDFA 325 in FIG. 3 in accordance with the disclosed techniques. For example, if present a trunk EDFA would be between 315 and 335. A common trunk and drop EDFA could be positioned between 303 and 315. FIG. 4 shows the difference between a splitter/combiner unit without trunk and drop fibers with a splitter/combiner unit with trunk and drop fibers. The components with hash marks depict components that may be shared with a splitter/combiner unit that only utilizes drop fiber connections, where the non-hash mark elements illustrate components added for enabling trunk functionality. The additional components include the single O/E converters 312a, 312b with controlled attenuators or gain units 311a, 311b, and WDM units 361 and 364 to connect the O/E converters 312a, 312b and splitters 335 feeding the trunk fibers 362, 366. These additional components shown may facilitate both a trunk and drop fiber architecture. However, embodiments are disclosed herein that utilize trunk architectures for expanding to trunk and drop splitter/combiner architectures. Overlaps in design, such as that shown by the configuration in FIG. 4 with the overlapping components between a splitter/combiner unit using only drop ports with a splitter/combiner unit that could use both trunk and drop ports, may be preferable from both a functionality and a complexity perspective. For example, if function may be preserved for the drop architecture while changing only a few optical parts to extend the functionality of the splitter/combiner for both trunk and drop functionality, then the splitter/combiner unit may have flexibility for different purposes.

FIG. 5 highlights the interfaces and changeable components for configuring a splitter/combiner suitable from trunk and drop architectures. As illustrated by FIG. 5, the interfaces added include: interface A: after WDM 303 combining upstream RFoG signals with other wavelengths; interface B: from trunk/drop splitter 315; interface C: to trunk WDM 361; and interface D: to second trunk WDM 369. Additional interfaces such as C and D between the splitter 335 and additional WDMs may be included if applicable to include additional trunk connections, but typically 2 trunk fibers will be enough.

The added components shown with the Label1 hash design in FIG. 5 include the combiner (+) 310, at 311*a*, 311*b* and O/E 312*a*, 312*b*, and components with the Label2 has design which include two splits (one before the B interface at 315 and the one before the C and D interfaces at 335). The components with the Label1 hash design may be included in a splitter/combiner unit design for adding a trunk and drop capability to the splitter/combiner unit, where such components may be used in just a drop capacity as well. Thus, the components that include the combiner (+) 310, at 311*a*, 311*b* and O/E 312*a*, 312*b* may be similar between splitter/combiner units, as these components add a trunk and drop capability to a splitter/combiner unit but can be used in a drop capacity as well.

Interfaces A, B, C and D shown in FIG. 5 indicate a possible configuration of a splitter/combiner unit 120, 130. However it should be understood that the two split components with the Label2 has design in FIG. 5 (the split before the B interface at 315 and the split before the C and D interfaces at 335) may vary from unit to unit. Further, split ratios may be set to required optical levels in trunk and drop fibers. For example, in some designs, trunk fibers may be connected with splitters as indicated where the splitter ratios may be set as needed for the network design. In some designs a fiber amplifier (EDFA) may be inserted in series with an interface, such as EDFA 325 shown between interfaces B and B' in the example, the EDFA included for amplifying forward signals for drop ports. These 4 interfaces made possible by the added components with the Label1 and Label2 hash designs are sufficient to have configuration flexibility for a splitter/combiner architecture with both trunk and drop fibers.

Figure 6:
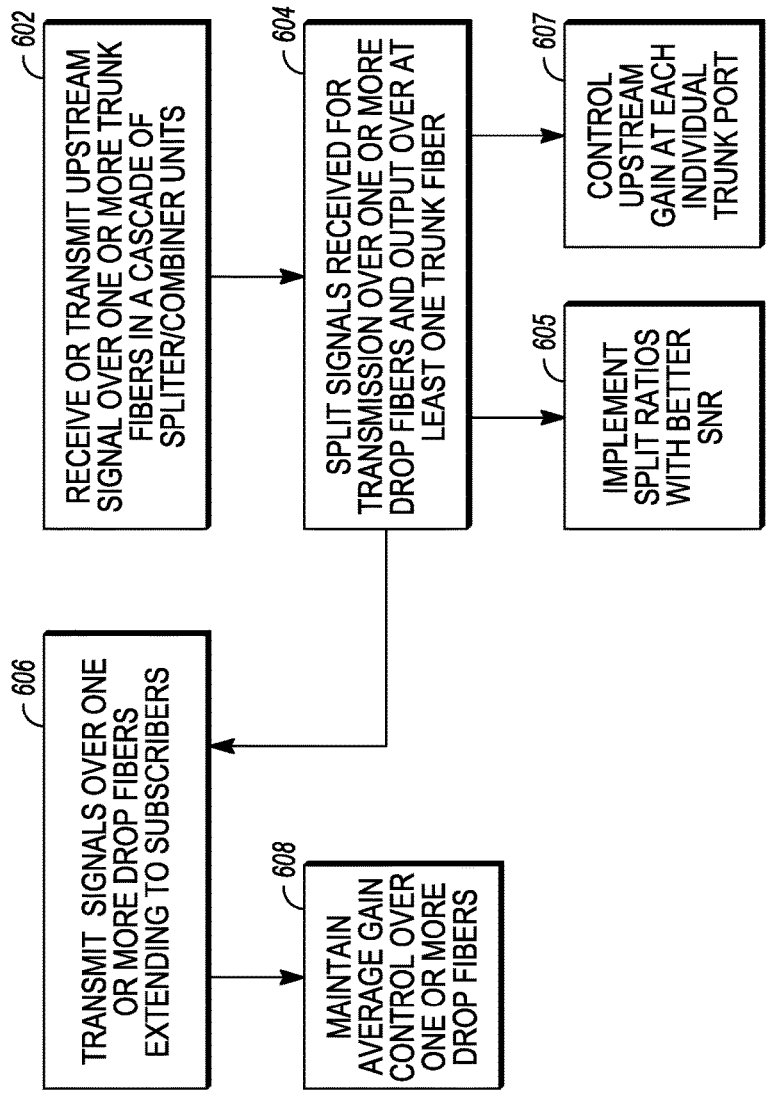
FIG. 6 is a flow diagram illustrating an embodiment for a splitter/combiner unit utilizing a trunk and drop architecture.

FIG. 6 is a flow diagram illustrating an embodiment for a splitter/combiner unit utilizing a trunk and drop architecture. As shown in FIG. 6, at 602 the splitter/combiner unit is configured for receiving or transmitting upstream signals over one or more trunk fibers in an environment of cascaded splitter/combiner units. At 604, each splitter/combiner unit in the cascade that receives a signal over a trunk port may split the signals for outputting signals over both one or more trunk ports as well as one or more drop ports that extend to subscribers, such as ONUS or another type of subscriber unit. At 605, the split of signals may be accomplished by implementing a split ratio that improves upon a relative SNR. For example, depending on the number of units in the cascade, the input signal level power, and the like, a different split ratio may be selected that optimizes or is a better relative split ratio for transmitting to both the trunk ports and the drop ports. By allotting more power to trunk ports than to drop ports could drive the split ratio for improving SNR. At 607, the splitter/combiner unit may control an upstream gain at each individual trunk port. At 608 the splitter/combiner unit maintains an average gain control over the one or more drop fibers.

Figure 7:
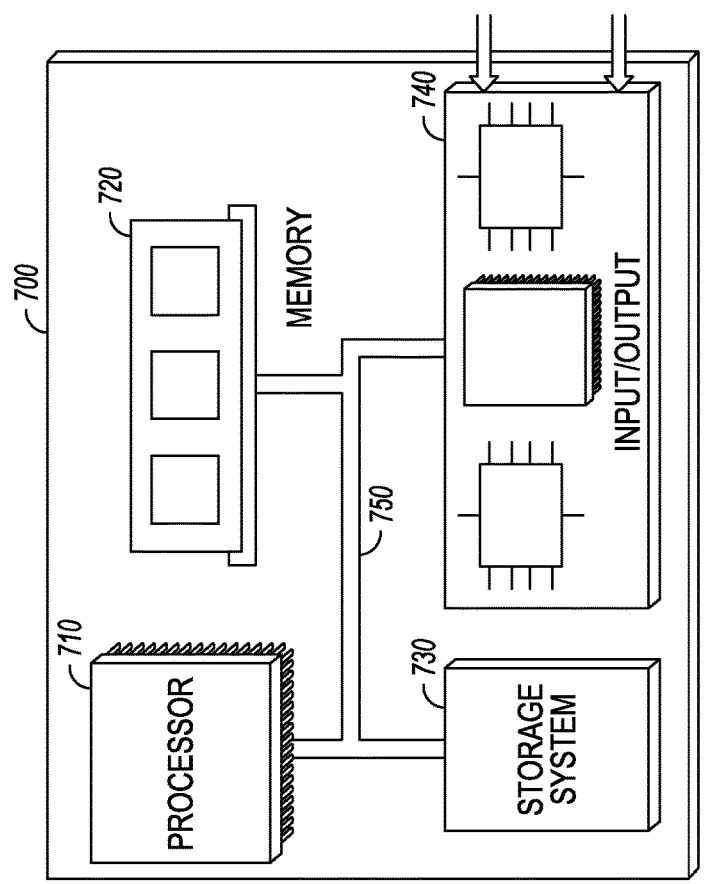
FIG. 7 is a block diagram of a hardware configuration operable to perform the functions disclosed herein.

FIG. 7 is a block diagram of a hardware configuration 700 operable to perform a portion of or some of the concepts described herein, such as the functionality depicted in FIG. 6. It should be understood that the hardware configuration 700 can exist in various types of devices. In embodiments, the hardware represents hardware included in a network element as disclosed herein for relaying content between a headend and a plurality of subscribers remote from the headend that include multiple cascaded splitter/combiner units. FIG. 7 depicts an example of a hardware configuration that may be included in each splitter/combiner unit to perform the functionality disclosed herein.

For example, the hardware configuration 700 can include a processor 710, a memory 720, a storage device 730, an input/output device 740, a clock 760, and a low pass filter 780. Each of the components 710, 720, 730, 740, 760, and 780 can, for example, be interconnected using a system bus 750. The processor 710 can be capable of processing instructions for execution within the hardware configuration 700. For example, as disclosed herein, one or more processors may be used to control upstream gain on an individual trunk port and/or implement average gain control on at least one drop port. In conjunction with splitters 335 and 340 in the hardware configuration depicted in FIG. 3, for example, the splitter/combiner 120, 130 may split a signal along a forward path direction in to a plurality of forward path signals via splitters 335 and 340. The splitter/combiner may also include one or more WDMs, 361, 364, 369, 374, 379 for separating upstream optical signals from downstream optical signals and receiving upstream optical signals from a plurality of subscribers and combining them to create a combined electrical signal. As noted above with respect to FIGS. 1 and 2, the splitter/combiner unit may include amplifier for combining the electrical signal and an O/E converter for converting the combined, amplified electrical signal in to an optical signal for further transmitting in the upstream direction.

In one implementation, the processor 710 can be a single-threaded processor. In another implementation, the processor 710 can be a multi-threaded processor. The processor 710 can be capable of processing instructions stored in the memory 720 or on the storage device 730.

As described above, the low pass filter may filter an output of the IFFT function to increase a sampling rate, by up-sampling with zeroes. For a range of IFFT sizes in an order of increasing size and an increasing value of A across the range, a number of multipliers for the low pass filtering for each of the IFFT sizes across the range increases at a slower rate than the value of A. Many embodiments are disclosed herein for the inclusion of a low pass filter, such as the example method of interpolation for increasing the sampling rate by up-sampling by zeroes followed by a Low-Pass Filter (LPF).

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to send communications to, and receive communications from one or more networks (e.g., subscriber network from content provider 105 of FIG. 1, network(s) 150 of FIG. 1, etc.). In implementations, the input/output device 740 can include driver devices configured to receive input data and send output data to other input/output devices, such as a gateway or router, as well as sending communications to, and receiving communications from a network 770, such as to and from a node or headend. Other implementations, however, can also be used, such as mobile computing devices, mobile communication devices, set-top box television client devices, etc.

In one or more examples, the functions disclosed herein may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors 710, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A splitter/combiner unit operating as a splitter in a forward direction and an active combiner in a reverse direction, the splitter/combiner unit configured for combination with one or more additional splitter/combiner units in a cascade of splitter/combiner units for relaying content between a head end and a plurality of subscribers remote from the head end, the splitter/combiner unit comprising:
   at least one trunk port for connecting said splitter/combiner unit to one or more of the one or more additional splitter/combiner units, the at least one trunk port configured for controlling upstream gain on an individual trunk port; and
   at least one drop port for transmitting signals over a drop fiber extending to one or more subscribers, the at least one drop port configured for average upstream gain control;
   wherein gain control of each of the at least one trunk port depends on at least one of:
      a respective trunk port input optical level, and/or
      a trunk port radio frequency (RF) signal level for a reference signal.

2. The splitter/combiner unit of claim 1, further comprising:
   a splitter for splitting a signal along a forward path direction into a plurality of forward path signals for delivery to respective subscribers;
   a combiner for receiving respective optical signals from the plurality of subscribers, combining them to create a combined electrical signal; and
   an amplifier for amplifying the combined electrical signal for propagating as an optical signal in a reverse path direction.

3. The splitter/combiner unit of claim 1, where an upstream laser is always active.

4. The splitter/combiner unit of claim 1, wherein in the downstream, splitting the power to drop and trunk ports is based on a ratio that improves SNR between splitter/combiner units and the cascaded trunk ports,
   the splitter/combiner unit further comprising one or more EDFAs to amplify signals independently among port types.

5. The system of claim 1, wherein the trunk and drop ports include connector interfaces configured for a relative loss between trunk and drop ports.

6. The splitter/combiner unit splitter/combiner unit of claim 1, wherein an EDFA is inserted in to at least one trunk or drop ports.

7. A splitter/combiner unit, operating as a splitter in a forward direction and an active combiner in a reverse direction, the splitter/combiner unit configured for combination with one or more additional splitter/combiner units in a cascade of splitter/combiner units for relaying content between a head end and a plurality of subscribers remote from the head end, said splitter/combiner unit comprising:
- at least one trunk port for connecting said splitter/combiner unit to one or more of the one or more additional splitter/combiner units, the at least one trunk port configured for controlling upstream gain on an individual trunk port; and
- at least one drop port for transmitting signals over a drop fiber extending to one or more subscribers, the at least one drop port configured for average gain control; and
- both a trunk fiber and a drop fiber for controlling upstream gain on the respective trunk port, wherein a radio frequency (RF) gain of upstream traffic on at least one drop port is switched on and off depending on a presence of upstream traffic on the drop fiber.

8. The splitter/combiner unit of claim 7, wherein gain control of each of the at least one trunk port depends on a respective trunk port input optical level.

9. The splitter/combiner unit of claim 7, wherein gain control of each of the at least one trunk port depends on a trunk port radio frequency (RF) signal level for a reference signal.

10. The splitter/combiner unit of claim 7, where the upstream traffic is detected by photodetector currents on the at least one drop port.

11. The splitter/combiner unit of claim 7, where the at least one trunk port of the splitter/combiner always has upstream gain, independently of whether drop ports are active or not.

12. The splitter/combiner unit of claim 7, further comprising
- a high performance low-noise receiver front-end to reduce an accumulation of noise and allow high input power for a better signal to noise ratio (SNR).

13. A The splitter/combiner unit of claim 7,
- where the at least one trunk port has individual gain control for maintaining a precise overall gain and adequate signal levels, and
- wherein gain control of each of the at least one trunk port depends on a respective trunk port input optical level.

14. A splitter/combiner unit operating as a splitter in a forward direction and an active combiner in a reverse direction, the splitter/combiner unit configured for combination with one or more additional splitter/combiner units in a cascade of splitter/combiner units for relaying content between a head end and a plurality of subscribers remote from the head end, said splitter/combiner unit comprising:
- at least one trunk port for connecting said splitter/combiner unit to one or more of the one or more additional splitter/combiner units, the at least one trunk port configured for controlling upstream gain on an individual trunk port;
- at least one drop port for transmitting signals over a drop fiber extending to one or more subscribers, the at least one drop port configured for average gain control; and
- automatic detectability of connections to the at least one trunk port or the at least one drop port through detection of input power state and a difference between on/off power states.

15. A splitter/combiner unit operating as a splitter in a forward direction and an active combiner in a reverse direction, the splitter/combiner unit configured for combination with one or more additional splitter/combiner units in a cascade of splitter/combiner units for relaying content between a head end and a plurality of subscribers remote from the head end, said splitter/combiner unit comprising:
- at least one trunk port for connecting said splitter/combiner unit to one or more of the one or more additional splitter/combiner units, the at least one trunk port configured for controlling upstream gain on an individual trunk port; and
- at least one drop port for transmitting signals over a drop fiber extending to one or more subscribers, the at least one drop port configured for average gain control;
- wherein pilot tones are used to provide precise modulation index calibration.

16. A splitter/combiner unit operating as a splitter in a forward direction and an active combiner in a reverse direction, the splitter/combiner unit configured for combination with one or more additional splitter/combiner units in a cascade of splitter/combiner units for relaying content between a head end and a plurality of subscribers remote from the head end, said splitter/combiner unit comprising:
- at least one trunk port for connecting said splitter/combiner unit to one or more of the one or more additional splitter/combiner units, the at least one trunk port configured for controlling upstream gain on an individual trunk port;
- at least one drop port for transmitting signals over a drop fiber extending to one or more subscribers, the at least one drop port configured for average gain control; and
- a radio frequency (RF) gain switch on at least one unused drop port through a detection of upstream traffic activity.

17. A method for transmitting signals between a splitter/combiner unit connected in a cascade of splitter/combiner units configured for relaying content between a head end and a plurality of subscribers remote from the head end, the method comprising:
- passing or amplifying signals in downstream direction over one or more drop fibers extending to one or more subscribers and receiving signals from the one or more subscribers such that a combined upstream electrical drop signal is obtained, the at least one drop port configured for average gain control for the combined drop upstream signal;
- passing or amplifying signals in downstream direction and receiving signals in an upstream direction via one or more trunk ports connected to at least one splitter/combiner unit in the cascade, the at least one trunk port configured for controlling upstream gain on an individual trunk port;
- controlling upstream gain by the at least one drop port and the at least one trunk port on each of the one or more individual trunks port of the splitter/combiner unit resulting in at least one trunk upstream signal,
- wherein a radio frequency (RF) gain of upstream traffic on at least one drop port is switched on and off depending on a presence of upstream traffic on the drop fiber, and
- wherein gain control of each of the at least one trunk port depends on at least one of:
  - a respective trunk port input optical level, and/or
  - a trunk port radio frequency (RF) signal level for a reference signal; and combining the at least one trunk upstream signal and the combined drop upstream signal and optically transmitting this combined signal in upstream direction.

18. A system for relaying content between a head end and a plurality of subscribers remote from the head end, the system comprising:
multiple cascaded splitter/combiner units, each splitter/combiner unit operating as a splitter in a forward direction and an active combiner in a reverse direction;
at least one of the multiple cascaded splitter/combiner units including at least one trunk port for connecting the at least one of the multiple cascaded splitter/combiner units to another of the cascaded splitter/combiner units and for controlling upstream gain on an individual trunk port; and
at least one of the multiple cascaded splitter/combiner units including at least one drop port with average gain control for connecting the at least one of the multiple cascaded splitter/combiner units with at least one of the plurality of subscribers, the at least one drop port for transmitting signals over a drop fiber extending to one or more subscribers, the at least one drop port configured for average upstream gain control,
wherein gain control of each of the at least one trunk port depends on at least one of:
a respective trunk port input optical level, and/or
a trunk port radio frequency (RF) signal level for a reference signal.

19. The system of claim 18, wherein in the downstream, splitting the power to drop and trunk ports is based on a ratio that improves SNR between splitter/combiner units and the cascaded trunk ports,
the system further comprising one or more EDFAs to amplify signals independently among port types.

20. The system of claim 18, wherein the trunk and drop ports include connector interfaces configured for a relative loss between trunk and drop ports.

* * * * *